United States Patent [19]

Enomoto

[11] Patent Number: 5,387,256
[45] Date of Patent: Feb. 7, 1995

[54] SMALL-CAPACITY COFFEE ROASTER

[76] Inventor: Kazuo Enomoto, 7-1-5 Sumiyoshi-miyacho, Higashinada, Kobe, Hyogo 658, Japan

[21] Appl. No.: 986,113

[22] Filed: Dec. 4, 1992

[30] Foreign Application Priority Data

Dec. 4, 1991 [JP] Japan .................................. 3-348870

[51] Int. Cl.⁶ .............................................. A47J 31/42
[52] U.S. Cl. ....................................... 99/286; 99/287; 99/483; 34/233; 34/553
[58] Field of Search ............... 99/286, 450, 483, 287; 34/53, 54, 233; 219/385, 386, 389

[56] References Cited

U.S. PATENT DOCUMENTS

| 4,196,342 | 4/1980 | Chailloux | 99/286 |
|---|---|---|---|
| 4,226,175 | 10/1980 | Sandor | 99/286 |
| 4,325,191 | 4/1982 | Klumagai et al. | 99/286 |
| 4,425,720 | 1/1984 | Elevitch | 99/450 |
| 4,455,763 | 6/1984 | Elevitch | 99/450 |
| 4,841,849 | 6/1989 | Shimomura et al. | 99/286 |
| 4,895,308 | 1/1990 | Tanaka | 99/286 |
| 5,083,502 | 1/1992 | Enomoto | 99/286 |

FOREIGN PATENT DOCUMENTS

| 35-18243 | 6/1956 | Japan . | |
|---|---|---|---|
| 2058977 | 3/1987 | Japan | 99/286 |
| 1-190317 | 7/1989 | Japan . | |
| 1-190318 | 7/1989 | Japan . | |
| 2-237519 | 9/1990 | Japan . | |
| 3-16128 | 3/1991 | Japan . | |
| 0251212 | 11/1991 | Japan | 99/286 |
| 3-251212 | 11/1991 | Japan . | |
| 4-40916 | 2/1992 | Japan . | |
| 4-224719 | 8/1992 | Japan . | |

Primary Examiner—David A. Scherbel
Assistant Examiner—Reginald L. Alexander
Attorney, Agent, or Firm—Marshall, O'Toole, Gerstein, Murray & Borun

[57] ABSTRACT

This disclosure relates to a small-capacity coffee roaster in which, even when roasting small quantities of raw coffee beans using direct-contact heat, the temperature can easily be controlled within the range vital for the roasting of coffee beans, and proper roasting can be accomplished in a short time. The roaster 10 comprises a stirring blade 12 provided at the bottom inside a roasting container 11, a ring-shaped sheathed heater 13 provided at the upper part of the container, an exhaust opening 7 having a smoke-removal filter 14 provided in the top wall of the container, and a temperature sensor 17 for detecting the temperature of the container provided on the underside of the bottom wall of the container. In addition, the container is made of good heat-conducting aluminum.

5 Claims, 3 Drawing Sheets

SMALL-CAPACITY COFFEE ROASTER

FIELD AND BACKGROUND OF THE INVENTION

This invention relates to a small-capacity coffee roaster suitable for roasting relatively small amounts of raw coffee beans. This small-capacity coffee roaster can be used in the home or at a coffee shop, etc., to roast only the amount of raw coffee beans needed to brew the desired amount of coffee, and it is also capable of being built into a fully automatic coffee maker which performs all of the processes from the roasting of the raw coffee beans to the brewing of the coffee.

In the past, the roasting of raw coffee beans has been generally carried out by commercial operations which roast large quantities of beans using large bulk roasters. The end user would then purchase the preroasted coffee beans (either whole roasted beans or preground beans) and brew coffee from them. In other words, in the past, roasters were generally not available for the roasting of coffee beans in small quantities by the end user in order to provide only the amount needed for the amount of brewed coffee desired. In response to this situation, the present applicant proposed fully automatic coffee makers capable of providing brewed coffee from raw coffee beans, as described in Japanese patent early publication Hei. 2-237,519 dated Sept. 20 1990, early publication Hei. 3-251,212 dated Nov. 8 1991, and early publication Hei. 4-40916 dated Feb. 12 1992. These coffee makers are equipped with a small-capacity coffee roaster for roasting only the required quantity of raw coffee beans. While this small-capacity coffee roaster is a direct-contact heating type, in other fully automatic coffee makers, such as those proposed in Japanese Patent Publication Hei. 3-16128, Japanese Patent Early Publications Hei. 1-190317 and Hei. 1-190318, and Japanese Patent Publication Sho. 35-18243, the roaster is of a hot-air type.

However, even when the capacity of the bulk coffee roasters of the prior art, which used iron or stainless steel roasting drums, was reduced in size for small-capacity roasting, it was not possible to roast small quantities of coffee beans in such a way that they would provide delicious brewed coffee. With the direct-contact heating type roasters of the prior art in particular, there was the problem that it was not possible to control the temperature with sufficient accuracy to properly roast the coffee beans in small quantities, and the beans would become burned before they had been properly roasted, that is, before they had expanded sufficiently and become sufficiently porous.

Thus, the primary objective of this invention is to provide a small-capacity coffee roaster which solves the problems of the prior art described above, wherein even when roasting small quantities of raw coffee beans using direct-contact heat, the temperature can easily be controlled within the range vital for the roasting of raw coffee beans, and proper roasting can be accomplished in a short time.

SUMMARY OF THE INVENTION

In order to accomplish the above objective, a small-capacity coffee roaster for roasting small quantities of raw coffee beans is provided, a feature of which is that a stirring roasting container for the beans is provided, a blade is provided at the bottom inside the container, a ring-shaped heater is provided at the upper part of the container, an exhaust opening having a smoke-removal filter is provided in the top wall of the container, a temperature sensor for detecting the temperature is provided on the underside of the bottom wall of the container, and, in addition, the container is made of aluminum.

In addition to the feature described above, another feature of the small-capacity coffee roaster according to this invention is that it is constructed so that the timing for the switching off of the heater is the time when the temperature has risen to the point at which the temperature sensor detects a temperature of between 170° and 200°, and also so that it has a temperature rise slope in which the length of time maintained for the bursting open of the coffee beans prior to the switching off of the heater is at least 40 seconds.

As a result of the first feature described above, because a container made of aluminum (a high heat conducting material) is used, the temperature of the container begins to rise quickly from the start of a heating cycle when the heater is switched on, thus making it possible for the temperature to quickly rise to a level appropriate for roasting. Moreover, once the temperature has risen to a certain level, the heat is actively radiated from the outer surfaces of the container, thus providing a gently sloping temperature rise curve. As a result, it is possible to maintain the temperature at a level appropriate for roasting for an extended length of time. The shape of the temperature rise curve can be easily adjusted by adjusting the outer surface area of the container, and also by adjusting the surface area of the smoke-removal filter-equipped exhaust opening and the heating power of the heater. By using this aluminum container and the exhaust opening in its top wall and applying indirect heat utilizing the radiant heat of the heater provided in the upper part of the container, even if the heating power of the heater is constant, it is possible to easily obtain a temperature curve in which the temperature rise begins quickly and moreover, in which the temperature rises gradually while it is within the temperature range appropriate for roasting. During roasting, a stirring blade at the bottom inside a container gently stirs the beans, thus preventing any uneven roasting.

In addition, as a result of the second feature described above, because the temperature for the completion of roasting is determined or sensed in accordance with the temperature of the underside of the bottom wall of the container, the installation of the sensor and its wiring and the detection of the temperature are all accomplished easily. Furthermore, for the temperature rise curve, it was experimentally verified that, by designing the coffee roaster so that roasting completion temperature (between 170° and 200° C.) is reached after a length of time of at least 40 seconds has passed for the bursting open of the coffee beans, the coffee beans are roasted so that they expand sufficiently and become sufficiently porous right to their core without becoming burned.

Detailed Description of the Invention

Figure 1:
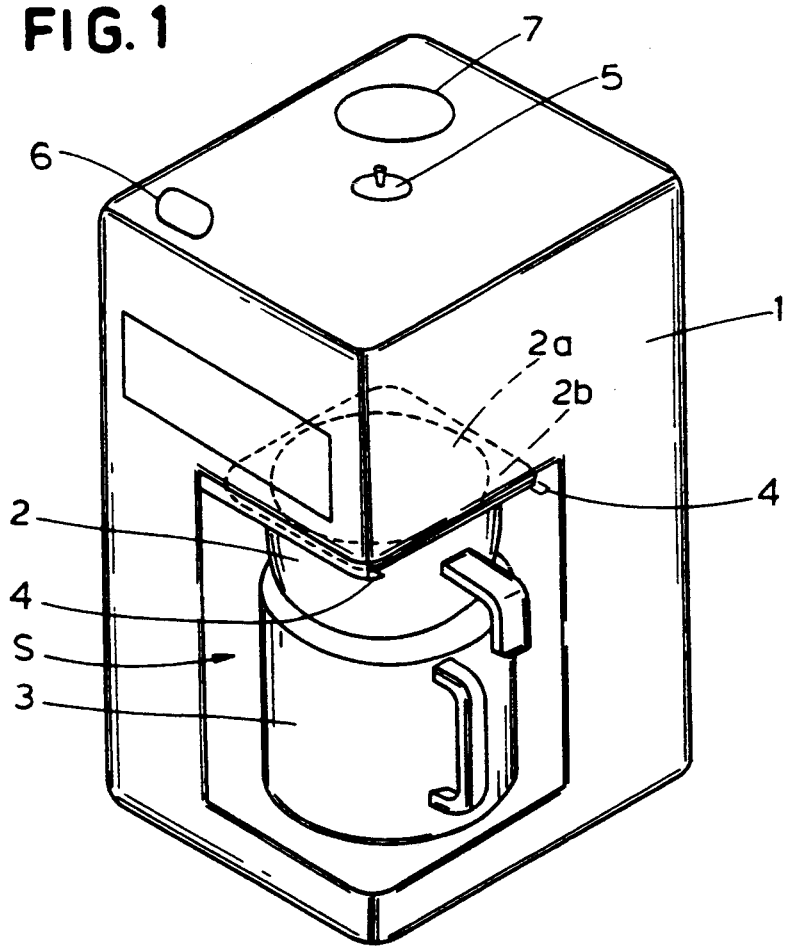
FIG. 1 is an overall perspective view of a fully automatic coffee maker equipped with a small-capacity coffee roaster in accordance with this invention.

With reference to FIG. 1, inside an outer case 1 are contained all of the major components of the coffee maker with the exception of the filter basket 2 and the decanter 3. The decanter 3 is a container for the purpose of catching the dripped coffee, and it is placed in a decanter placement space S which is formed by shaping a part of the outer case 1 into a concave shape. In addition, the filter basket 2 is a container-shaped component for the purpose of filtering and dripping the brewed coffee, and a filter is placed in a freely removable manner into this filter basket along the inner walls of the basket. For this filter it is possible to use a disposable type such as a paper filter.

On both sides of the ceiling part 9 of the decanter placement space S are securing guides 4 which support the filter basket 2. The filter basket 2 is secured by inserting it so that the flanges 2b on the side edges of the opening 2a of the basket rest on the securing guides 4. In addition, the filter basket 2 can be easily removed by sliding it out, thus allowing the filter basket 2 and the filter to be freely removed.

In the top of the outer case 1 are provided a raw coffee bean supply opening 5, a water supply opening 6, and an exhaust opening 7 for the roaster 10, which will be described later.

Figure 2:
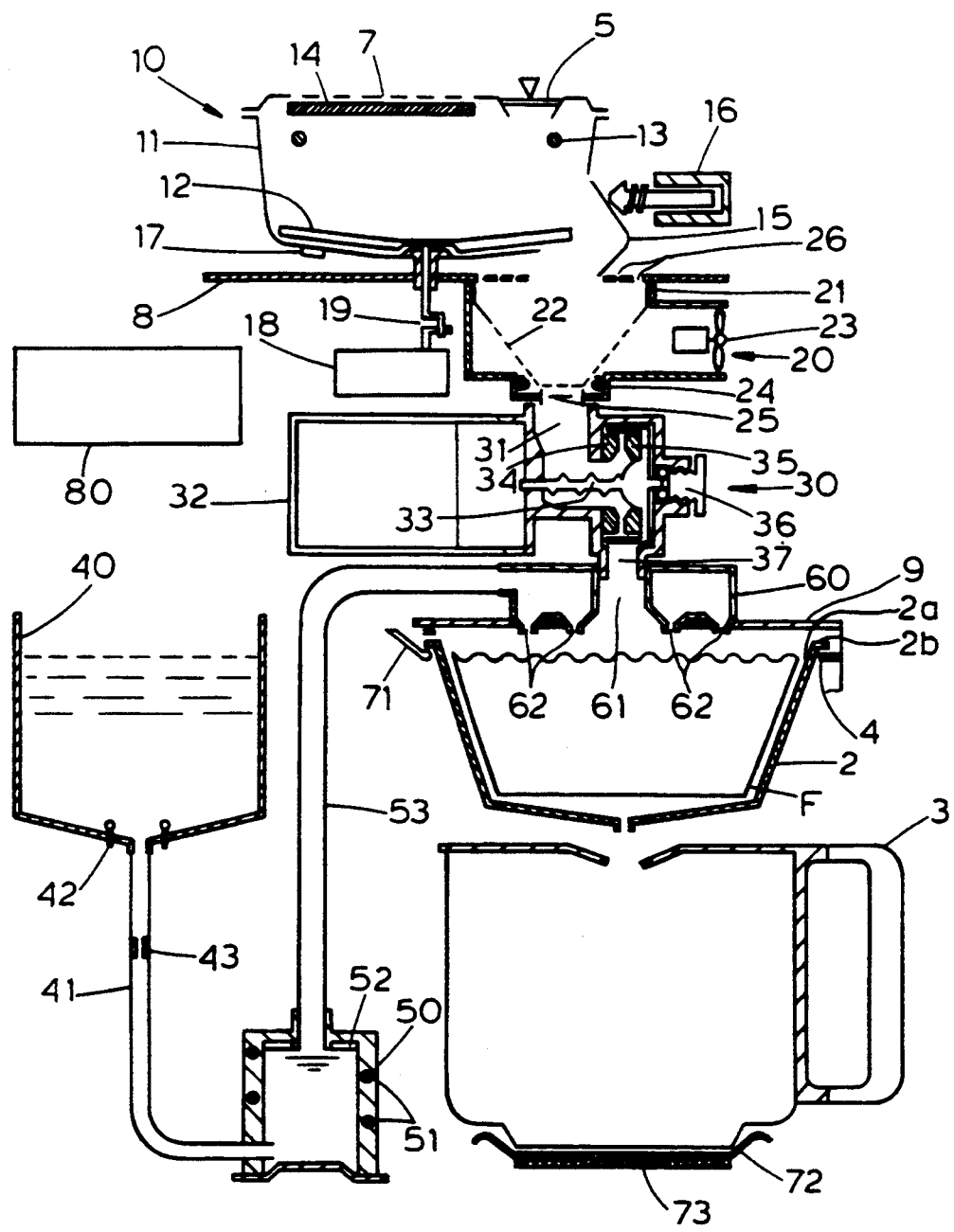
FIG. 2 is a cross-sectional diagrammatic view of the coffee maker.

With reference to FIG. 2, the roaster 10 is provided in the uppermost part inside the outer case 1. This roaster 10 is designed to roast the raw coffee beans which are placed inside, and it is comprised of an aluminum container 11. Inside this container 11, a stirring blade 12 is provided at the lower part thereof, a ring-shaped sheathed heater 13 for roasting is provided at the upper part thereof, and a high-temperature catalyst filter 14 for smoke and odor removal is also provided. Together with this high-temperature catalyst filter 14 for smoke and odor removal, the exhaust opening 7 mentioned earlier is provided in the top wall of the container 11, which is also the top of the outer case 1. In addition, a coffee bean discharge door 15 is provided at a section of the bottom of the container 11, and this door is designed so that it can be opened and closed by a solenoid 16. A temperature sensor 17 is also installed on the underside of the bottom of the container 11, and it detects the completion of roasting by sensing the temperature at the underside of the container. A stirring motor 18 turns the stirring blade 12 via an anti-thermal-conduction joint 19. Furthermore, in order to prevent any adverse effects from the radiation of heat from the container 11, which is a source of heat radiation, a radiant heat blocking plate 8 is arranged beneath the container 11, thus isolating the compartment in which the roaster 10 is located, from the stirring motor 18 and also from other components such as the controller and the cooling means, which will be described later. This radiant heat blocking plate 8, unlike the synthetic resin of the outer case 1, is preferably composed of an iron plate.

Because the container 11 is made of aluminum, unlike the stainless steel and iron containers used in the prior art, it is easily heated and it also easily discharges heat. When the heater is switched on the container temperature quickly begins to rise. In addition, because it has good thermal conductivity, the entire bottom wall of the container is heated to a substantially uniform temperature by the radiant heat from the ring-shaped sheathed heater 13 located at the upper part of the container. Of course, uniform heating of the beans is also provided from above by the indirect and wide-area heat from the ring-shaped sheathed heater 13. Furthermore, with this aluminum container, because the amount of heat discharged becomes large at a relatively early stage when the temperature rises to a certain level, the amount of heat provided by the heater 13 and the amount of heat discharged or lost by the container 11 gradually become similar, and the slope of the temperature rise curve gradually becomes more gentle. Thus, by using an aluminum container and adjusting the outer surface area of the container and also the surface area of the exhaust opening 7 in order to adjust the amount of heat discharged, it is then possible to easily obtain a temperature rise curve appropriate for the roasting of coffee beans simply by selecting an appropriate constant heating power for the heater. With a container made of iron or stainless steel, it is not easy to obtain a temperature rise curve appropriate for the roasting of small quantities of coffee beans in a small-capacity container. In particular, it is difficult to obtain a temperature curve appropriate for roasting without changing the heating power of the heater 13 partway through the process.

By providing the temperature sensor 17 on the underside of the bottom wall of the container 11, it is possible to accurately detect, through the bottom wall, the temperature conditions of the coffee beans being roasted at the upper side of the bottom wall inside the container 11. Of course, because the heater 13 is located in the upper part of the container 11, the heating is not uneven. Although it would ideally be best to detect the temperature of the coffee beans directly, the wiring, durability, and other factors of the sensor would then present problems.

With this invention, the thickness of the walls of the container are within a range of approximately 0.5–1.5 mm, preferably about 1 mm, and the timing for the switching off of the heater is the time when the temperature has risen to the point at which the temperature sensor 17 detects a temperature of between 170° C. and 200° C. In other words, the temperature for the switching off of the heater is within the range of 170°–200° C. In addition, the roaster is constructed so that it has a temperature rise slope in which the length of time maintained for the bursting open of the coffee beans prior to the switching off of the heater is at least 40 seconds. Because the coffee beans begin to burst open when the temperature of the underside of the bottom wall of the container reaches 150°–160° C., this composition can be achieved by determining beforehand such factors as the outer surface area of the container 11, the surface area of the exhaust opening 7, and the heating power of the heater 13 so that the temperature rises slowly in the range from the temperature at which the coffee beans begin to burst open and the temperature at which the heater is switched off, requiring at least 40 seconds to rise the 20°–40° C. between these two temperatures. By maintaining a length of time of at least 40 seconds for the bursting open of the coffee beans before the temperature reaches 170°–200° C., which, as mentioned earlier, is the temperature at which the heater is switched off, the coffee beans can be roasted so that they expand sufficiently and become sufficiently porous right to their core before they have a chance to become burned (over-roasted).

Figure 3:
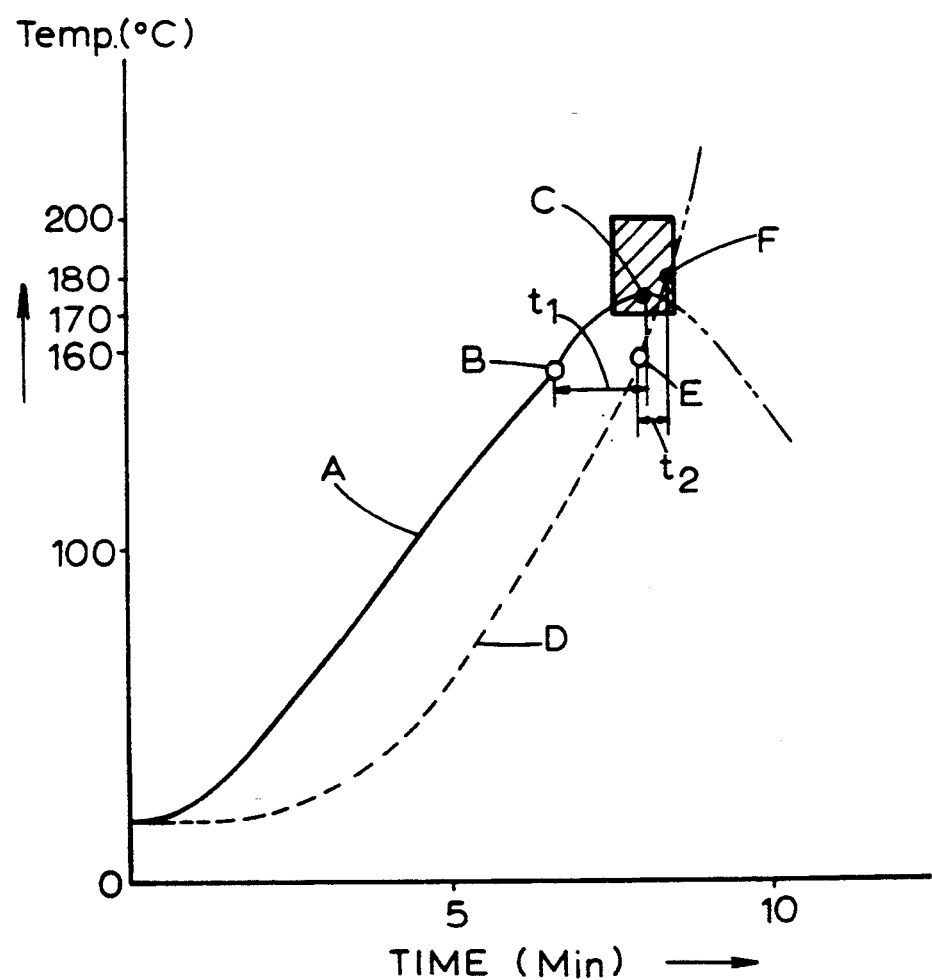
FIG. 3 are curves showing the change in the temperature at the underside of the bottom wall of the roaster container during roasting.

As a specific, but nonlimiting, example, if the volume of the cylindrical aluminum container 11 is 900 cc, the thickness of the container walls is 1 mm, the power of the sheathed heater 13 is 350 W, the stirring blade (two-fin blade) turns at 60 rpm, and 60 g of raw coffee beans are roasted, the temperature of the underside of the bottom wall of the container and the temperature condition of the beans will be as indicated by the solid line A in FIG. 3. In other words, the beans began to burst open at the point indicated by the white circle B (approximately 6.5 minutes, approximately 155° C.), and then, at the point indicated by the black circle C (approximately 8 minutes, approximately 176° C.), the heater 13 is switched off and roasting is completed. The length of time $t_1$ from the time when the beans began to burst open to the time when the heater was switched off (completion of roasting) is approximately 90 seconds, and the roasted coffee beans thus obtained had expanded sufficiently and become sufficiently porous right to their core, indicating an optimum roasted condition (in other words, having good body and aroma, with appropriately controlled acidity and a good brewing rate). The moisture content of the beans was 11% before roasting, 3% at the completion of roasting, and 2.5% at the completion of forced-air cooling by a cooler, which will be described later. If moisture remains in coffee beans after roasting, it will combine with the tannin contained in the beans and form pyrogallic acid, which would adversely affect the quality of the brewed coffee, but this is completely prevented.

The results obtained when roasting was performed under the same conditions using a container made of stainless steel are indicated by the dashed line D. In this case, the length of time $t_2$ from the time when the beans began to burst open to the time when the heater was switched off (completion of roasting) (between circles E and F) was only approximately 30 seconds, and the beans did not expand sufficiently or become sufficiently porous. The beans became burned before having a chance to become porous.

It should be noted that, in this invention, the term "small-capacity coffee roaster" refers to roasters for roasting approximately 20–60 g, or at most no more than 100 g, of raw coffee beans at one time.

In the present specific example, the surface area of the container 11 is 400.7 cm$^2$, and the surface area of the top cover is 194.1 cm$^2$. The surface of the aluminum roasting container is treated with alumite to prevent corrosion, rust and discoloration. The diameter of the container 11 and the cover is substantially 143 mm, the height of the container 11 is substantially 78 mm, and the height of the cover is substantially 8 mm. The heater 13 is substantially 59 mm above the bottom and 19 mm below the top of the container 11, and the heater 13 is approximately 24 mm above the upper level of the beans being roasted.

Beneath the discharge door 15 of the roaster 10, a cooler 20 is provided separately as a means for cooling the roasted coffee beans. This cooler 20 is comprised of a blower case 21, a temporary holding tank 22 located inside the blower case, and a blower 23 which draws in and blows air from the outside. The automatic controls cause the cooling fan or blower 23 to turn on at substantially the same time that the container door 15 opens and allows the beans to fall into the holding tank 22. The temporary holding tank 22 features a mesh construction for at least its lower half, thus allowing the air blown in by the blower 23 to enter from the lower half of the temporary holding tank 22 and then escape upwardly. At the bottom of the temporary holding tank 22 are provided an optical sensor 24 for detecting remaining coffee beans and a drop shutter or door 25. Cooling air exhaust holes 26 are provided in the radiant heat blocking plate 8.

A grinder 30 is provided separately beneath the temporary holding tank 22 of the cooler 20 as a means of grinding the coffee beans. This grinder 30 is a mill type grinder. Beneath the coffee bean receiving opening 31 is located a feed screw 33 turned by a motor 32 equipped with a speed reducer, and at the end in the conveying direction of this feed screw 33 is located a mill unit comprised of a revolving mill tooth 35 secured to the end of the feed screw 33 and a stationary mill tooth 34. The coffee beans are ground between the revolving mill tooth 35 and the stationary mill tooth 34. The degree of fineness to which the beans are ground is adjusted by turning an adjustment knob 36 in order to adjust the gap between the revolving mill tooth 35 and the stationary mill tooth 34. Beneath the mill unit is provided a discharge opening 37 for the ground coffee beans.

The means for heating and supplying the water for the brewing of the coffee is comprised of a water tank 40, a vertical boiler 50, and a hot water supplier 60. The water tank 40 collects the water which is poured in through the water supply opening 6, and supplies it to the bottom of the vertical boiler 50 via a water supply pipe 41 which is connected to the bottom of the tank 40. Although the water tank 40 in this embodiment is a stationary type, it is also possible for it to be a cassette type capable of being freely inserted and removed. At the bottom of the water tank 40 is provided a tank-empty sensor 42 which detects when the tank is out of water. In addition, by providing a narrow neck 43 partway along the water supply pipe 41, it is possible to prevent the reverse flow of water from the boiler 50, and to effectively cause the water heated by the boiler 50 to flow upwardly through the hot water supply pipe 53 to the hot water supplier 60. The vertical boiler 50 has a heater 51 embedded inside its peripheral wall, and a steam collector 52 provided at its top. The hot water supply pipe 53 is connected vertically from the top of the boiler 50, with the other end connected to the hot water supplier 60.

The hot water supplier 60 is comprised of a ring-shaped container provided with a through-hole 61 at its center, and in the bottom of the ring-shaped container are provided multiple hot water drop-supply openings 62 which are concentrically arranged around the through-hole 61. By fitting the discharge opening 37 of the grinder 30 into the through-hole 61, the through-hole 61 becomes a drop-supply opening 61 for the ground coffee beans. This ground coffee drop-supply opening 61 and the hot water drop-supply openings 62 arranged around it face downwardly toward the decanter placement space S from the ceiling part 9 of the space S.

A filter basket detection sensor 71 detects whether or not the filter basket 2 is secured to the ceiling part 9. F is a paper filter placed inside the filter basket 2. A keep-warm plate 72 is provided at the location in which the decanter 3 is placed, and 73 is a keep-warm heater. A controller 80 is located at a position lower than that of the radiant heat blocking plate 8, and it contains a microcomputer and controls the various components of the coffee maker.

The raw coffee beans are roasted by the roaster 10, cooled by the cooler 20, and then ground by the grinder 30. In addition, hot water is supplied by the water heating and supply means (40, 50, and 60). Thus, by placing a filter such as the paper filter F in the filter basket 2 and inserting this filter basket 2 along the securing guides 4 so that it is secured to the ceiling part 9 of the decanter placement space S, ground coffee is drop-supplied into the filter basket 2 from the ground coffee drop-supply opening 61 in the center and, simultaneously with this dropping of the ground coffee or slightly after, hot water is drop-supplied into the filter basket 2 from the surrounding hot water drop-supply openings 62, thus producing brewed coffee by the drip method. When dripping is finished, by detaching the filter basket 2, removing the used coffee grounds together with the filter 2a, placing a new filter in the filter basket 2, and re-securing the filter basket 2 to the ceiling part 9 of the decanter placement space S, the preparation for re-use is completed.

Because the ground coffee is drop-supplied into approximately the center of the filter basket 2 and the hot water is drop-supplied around it, the brewing of the coffee from the ground coffee beans by the hot water is uniform, and also any scattering of the ground coffee powder is prevented by the hot water falling around it.

All of the power components and the controls are electrical, and a power cord (not shown) is provided for connecting the unit to a wall outlet. The electronic control unit 80 is connected to and controls all of the functions (including those of the roaster) of the coffee maker, and the construction of the control unit 80 may be conventional and obvious to those skilled in this art.

With the small-capacity coffee roaster of this invention described herein and Set out in the claims, having the composition described above, because a stirring blade is provided at the bottom inside a container, a ring-shaped heater is provided at the upper part of the container, an exhaust opening having a smoke-removal filter is provided in the top wall of the container, and a temperature sensor for detecting the temperature of the container is provided on the underside of the bottom wall of the container, and, in addition, because the container is made of aluminum, by adjusting the aluminum container and the exhaust opening in the top wall of the container in order to adjust the amount of heat discharged, even if the heating power of the heater is constant, it is possible to easily obtain a temperature curve in which the temperature rise begins quickly and, moreover, in which the temperature rises gradually while it is within the temperature range appropriate for roasting, thus easily making it possible to perform the proper roasting of raw coffee beans. In other words, with the roaster of this invention, even when roasting small quantities of raw coffee beans using direct contact heat, the temperature can easily be controlled within the range vital for the roasting of raw coffee beans and proper roasting can be accomplished in a short time.

In addition, it is constructed so that the timing for the switching off of the heater is the time when the temperature has risen to the point at which the temperature sensor detects a temperature of between 170° C. and 200° C., and also so that it has a temperature rise slope in which the length of time maintained for the bursting open of the coffee beans prior to the switching off of the heater is at least 40 seconds, it is possible to roast the coffee beans so that they expand sufficiently and become sufficiently porous right to their core without becoming burned.

The disclosures of K. Enomoto, patent application Serial No. 07/986,111, titled "Coffee Maker" and K. Enomoto, patent application Serial No. 07/986,114 (now U.S. Pat. No. 5,267,507 titled "Coffee Maker", both filed simultaneously herewith, are incorporated herein by reference.

What is claimed is:

1. A small-capacity coffee roaster for roasting small quantities of raw coffee beans, comprising:
    an aluminum roasting container for receiving said raw coffee beans including an upper part, a bottom, a bottom wall and a top wall;
    a ring shaped heater provided at said upper part of said container;
    an exhaust opening in said top wall;
    a smoke-removal filter in said top wall;
    a temperature sensor for detecting the temperature of said container provided on the underside of said bottom wall of said container;
    means for switching off said heater when said temperature sensor detects a temperature of between 170° C. and 200° C.; and
    means for providing a bean burst open time interval of at least 40 seconds between the time said container reaches a temperature sufficient to begin to burst open said coffee beans and the time said heater is switched off.

2. The roaster of claim 1 wherein said time said container reaches said temperature sufficient to burst open said coffee beans is the time said temperature sensor detects a temperature of between 150° C. and 160° C.

3. The roaster of claim 2 wherein said providing means provides said roasting time interval when said heater is maintained at a constant heating power.

4. A small-capacity coffee roaster for roasting small quantities of raw coffee beans, comprising:
    an aluminum roasting container for receiving said raw coffee beans including an upper part, a bottom, a bottom wall and a top wall;
    a ring shaped heater provided at said upper part of said container;
    an exhaust opening in said top wall;
    a smoke-removal filter in said top wall;
    a temperature sensor for detecting the temperature of said container providing on the underside of said bottom wall of said container;
    means for controlling the rate of temperature increase within said container, wherein the time said temperature sensor detects a temperature of between 150° C. and 160° C. and the time said temperature sensor detects a temperature of between 170° C. and 200° C. is greater than 40 seconds; and
    means for switching off said heater when said temperature sensor detects a temperature of between 170° C. and 200° C.

5. The roaster of claim 4 wherein said controlling means controls said rate of temperature increase when said heater is maintained at a constant heating power.

* * * * *